(12) United States Patent
Lynn

(10) Patent No.: US 10,371,185 B2
(45) Date of Patent: Aug. 6, 2019

(54) MAGNETICALLY-CONTROLLED CONNECTORS AND METHODS OF USE

(71) Applicant: David Lynn, Welcome, NC (US)

(72) Inventor: David Lynn, Welcome, NC (US)

( * ) Notice: Subject to any disclaimer, the term of this patent is extended or adjusted under 35 U.S.C. 154(b) by 322 days.

(21) Appl. No.: 15/401,868

(22) Filed: Jan. 9, 2017

(65) Prior Publication Data

US 2018/0195543 A1   Jul. 12, 2018

(51) Int. Cl.
| *F16B 5/06* | (2006.01) |
| *H02S 20/00* | (2014.01) |
| *H02S 40/30* | (2014.01) |

(52) U.S. Cl.
CPC ............ *F16B 5/0635* (2013.01); *H02S 20/00* (2013.01); *H02S 40/30* (2014.12)

(58) Field of Classification Search
CPC ............... Y10T 292/11; Y10T 70/7057; Y10T 70/7904; Y10T 24/32; E05B 47/004; E05B 47/0038; E05B 47/0045; E05B 15/0073; E05B 73/0052; A45C 13/1069
USPC ..................................................... 292/251.5
See application file for complete search history.

(56) References Cited

U.S. PATENT DOCUMENTS

| | | | |
|---|---|---|---|
| 3,920,212 A | 11/1975 | Westwood | |
| 3,974,581 A | 8/1976 | Martens et al. | |
| 4,339,853 A | 7/1982 | Lipschitz | |
| 4,570,194 A | 2/1986 | Schatteman | |
| 4,651,136 A | 3/1987 | Anderson et al. | |
| 4,718,681 A | 1/1988 | Kakehi et al. | |
| 4,848,812 A * | 7/1989 | Slaughter | E05C 19/163 292/144 |
| 4,919,464 A | 4/1990 | Richards | |
| 5,009,243 A | 4/1991 | Barker | |
| 5,038,535 A | 8/1991 | Van Praag, III | |
| 5,061,112 A | 10/1991 | Monford, Jr. | |
| 5,076,623 A * | 12/1991 | Richards | E05B 47/0038 292/144 |
| 5,094,567 A | 3/1992 | Nista et al. | |
| 5,337,459 A | 8/1994 | Hogan | |
| 5,485,733 A * | 1/1996 | Hoffman | E05B 47/004 70/276 |
| 5,644,177 A | 7/1997 | Guckel et al. | |
| 5,781,974 A | 7/1998 | Breil et al. | |
| 5,996,831 A * | 12/1999 | Teok | E05B 47/004 220/230 |
| 6,066,796 A | 5/2000 | Itoyama et al. | |
| 6,084,498 A | 7/2000 | Stelter et al. | |

(Continued)

FOREIGN PATENT DOCUMENTS

| CN | 103715286 A | 4/2014 |
| CN | 203690320 U | 7/2014 |

(Continued)

*Primary Examiner* — Mark A Williams
(74) *Attorney, Agent, or Firm* — Coats & Bennett, PLLC

(57) ABSTRACT

A magnetically-controlled connector for attaching a panel to a support member. The connector is configurable between locked and unlocked positions. In the locked position, an arm extends outward to engage with an exterior support member. In the unlocked position, the arm is retracted inward and is disengaged from the support member. The connector is configured to be movable between the positions using a magnetic actuator that is selectively moved into and out of proximity of the connector.

15 Claims, 10 Drawing Sheets

(56) References Cited

U.S. PATENT DOCUMENTS

| | | | |
|---|---|---|---|
| 6,474,120 B1* | 11/2002 | Wadsworth | E05B 63/185 |
| | | | 292/251.5 |
| 6,499,907 B1 | 12/2002 | Baur | |
| 6,584,737 B1 | 7/2003 | Bradley, Jr. | |
| 6,765,330 B2 | 7/2004 | Baur | |
| 6,786,012 B2 | 9/2004 | Bradley, Jr. | |
| 6,936,789 B2 | 8/2005 | Hanzel | |
| 7,217,059 B1 | 5/2007 | Rudduck | |
| 7,331,616 B2 | 2/2008 | Brei et al. | |
| 7,481,211 B2 | 1/2009 | Klein | |
| 7,501,572 B1 | 3/2009 | Rabinowitz | |
| 7,567,159 B2 | 7/2009 | Macken | |
| 7,631,467 B2 | 12/2009 | Clarke | |
| 7,814,899 B1 | 10/2010 | Port | |
| 7,921,843 B1 | 4/2011 | Rawlings | |
| 7,971,398 B2 | 7/2011 | Tweedie | |
| 8,136,310 B2 | 3/2012 | Tweedie | |
| 8,151,789 B2 | 4/2012 | Klein | |
| 8,156,628 B2 | 4/2012 | Roth | |
| 8,166,836 B2 | 5/2012 | Rudduck | |
| 8,225,557 B2 | 7/2012 | Stearns et al. | |
| 8,413,388 B2 | 4/2013 | Stearns et al. | |
| 8,418,419 B1 | 4/2013 | Aseere et al. | |
| 8,418,688 B2 | 4/2013 | King et al. | |
| 8,453,986 B2 | 6/2013 | Schnitzer | |
| 8,455,752 B2 | 6/2013 | Korman et al. | |
| 8,464,478 B2 | 6/2013 | Tweedie | |
| 8,522,492 B2 | 9/2013 | Tachino | |
| 8,595,996 B2 | 12/2013 | Korman et al. | |
| 8,674,212 B2 | 3/2014 | Huber et al. | |
| 8,733,027 B1 | 5/2014 | Marston et al. | |
| 8,736,406 B2* | 5/2014 | Hapke | D06F 37/42 |
| | | | 335/207 |
| 8,746,415 B2* | 6/2014 | Aluisetti | B66B 1/468 |
| | | | 187/391 |
| 8,748,733 B2 | 6/2014 | Leary | |
| 8,752,338 B2 | 6/2014 | Schaefer et al. | |
| 8,756,881 B2 | 6/2014 | West et al. | |
| 8,763,978 B2 | 7/2014 | Newman et al. | |
| 8,776,456 B1 | 7/2014 | Schrock | |
| 8,826,606 B2 | 9/2014 | Yen | |
| 8,881,472 B2 | 11/2014 | Knapp | |
| 8,922,972 B2 | 12/2014 | Korman et al. | |
| 8,950,157 B1 | 2/2015 | Schrock | |
| 8,960,615 B1 | 2/2015 | Johnson et al. | |
| 9,057,545 B2 | 6/2015 | Stapleton | |
| 9,057,546 B2 | 6/2015 | Sade | |
| 9,080,792 B2 | 7/2015 | Patton et al. | |
| 9,145,685 B2 | 9/2015 | Stapleton | |
| 9,146,009 B2 | 9/2015 | Zhu | |
| 9,106,023 B2 | 11/2015 | Schaefer et al. | |
| 9,225,126 B2 | 12/2015 | Janfada et al. | |
| 9,231,518 B2 | 1/2016 | Cinnamon et al. | |
| 9,252,310 B2 | 2/2016 | Stephan et al. | |
| 9,267,278 B1 | 2/2016 | Gibson | |
| 9,297,169 B2 | 3/2016 | Pantev | |
| 9,307,797 B2 | 4/2016 | Sanchez Giraldez | |
| 9,331,629 B2 | 5/2016 | Cheung et al. | |
| 9,345,154 B2* | 5/2016 | Peng | F16B 1/00 |
| 9,447,619 B2* | 9/2016 | Trinh | E05C 19/16 |
| 9,453,660 B2 | 9/2016 | French et al. | |
| 9,455,662 B2 | 9/2016 | Meine | |
| 9,471,095 B2* | 10/2016 | Ho | G06F 1/16 |
| 9,548,696 B2 | 1/2017 | Atchley et al. | |
| 9,694,990 B2* | 7/2017 | Voser | B65G 49/00 |
| 10,155,319 B2* | 12/2018 | Lynn | B25J 15/0608 |
| 2005/0062296 A1 | 3/2005 | Lyon | |
| 2005/0166383 A1 | 8/2005 | Newberry | |
| 2007/0212166 A1 | 9/2007 | Rudduck | |
| 2008/0149170 A1 | 6/2008 | Hanoka | |
| 2009/0114269 A1 | 5/2009 | Fletcher et al. | |
| 2009/0211621 A1 | 8/2009 | LeBlanc | |
| 2009/0293383 A1 | 12/2009 | Venter et al. | |
| 2010/0175337 A1 | 7/2010 | Mascolo et al. | |
| 2010/0212654 A1 | 8/2010 | Alejo Trevijano | |
| 2010/0319291 A1 | 12/2010 | Pervan et al. | |
| 2011/0079214 A1 | 4/2011 | Hon | |
| 2011/0120532 A1 | 5/2011 | Neugent et al. | |
| 2011/0154774 A1 | 6/2011 | Rawlings | |
| 2011/0203637 A1 | 8/2011 | Patton et al. | |
| 2011/0314751 A1 | 12/2011 | Jette | |
| 2012/0080890 A1* | 4/2012 | Loret de Mola | E05B 5/00 |
| | | | 292/157 |
| 2012/0228442 A1 | 9/2012 | Clifton | |
| 2013/0036683 A1 | 2/2013 | Seymour et al. | |
| 2013/0149029 A1 | 6/2013 | Changsrivong et al. | |
| 2013/0174887 A1 | 7/2013 | Yagi | |
| 2013/0193301 A1 | 8/2013 | Jackson et al. | |
| 2013/0219812 A1 | 8/2013 | Goodman et al. | |
| 2014/0003861 A1 | 1/2014 | Cheung et al. | |
| 2014/0060626 A1 | 3/2014 | Stephan et al. | |
| 2014/0061411 A1 | 3/2014 | Stephan et al. | |
| 2014/0090310 A1 | 4/2014 | Greene | |
| 2014/0158184 A1 | 6/2014 | West et al. | |
| 2014/0167424 A1 | 6/2014 | Frias | |
| 2014/0196770 A1 | 7/2014 | Jacobs, IV | |
| 2015/0027509 A1 | 1/2015 | Levin | |
| 2015/0200618 A9 | 7/2015 | West et al. | |
| 2015/0249425 A1 | 9/2015 | Fukumochi | |
| 2015/0256125 A1 | 9/2015 | Kouyanagi et al. | |
| 2015/0288327 A1 | 10/2015 | Cherukupalli et al. | |
| 2015/0295534 A1 | 10/2015 | Maruyama et al. | |
| 2015/0322979 A1 | 11/2015 | Giacalone et al. | |
| 2015/0322980 A1 | 11/2015 | Giacalone et al. | |
| 2015/0330669 A1 | 11/2015 | Port et al. | |
| 2015/0372635 A1 | 12/2015 | Praca et al. | |
| 2016/0056316 A1 | 2/2016 | Clark | |
| 2016/0056752 A1 | 2/2016 | Atchley et al. | |
| 2016/0072426 A1 | 3/2016 | Babineau, Jr. et al. | |
| 2016/0118726 A1 | 4/2016 | Schaefer et al. | |
| 2016/0138833 A1 | 5/2016 | Stephan et al. | |
| 2016/0142006 A1 | 5/2016 | Meine et al. | |
| 2016/0214547 A1 | 7/2016 | Iriarte Jimenez et al. | |
| 2016/0254774 A1 | 9/2016 | Brady et al. | |
| 2016/0336695 A1 | 11/2016 | Janfada et al. | |
| 2017/0012573 A1 | 1/2017 | Flaherty et al. | |
| 2017/0012574 A1 | 1/2017 | Babineau, Jr. et al. | |

FOREIGN PATENT DOCUMENTS

| | | |
|---|---|---|
| DE | 202012100662 U1 | 5/2013 |
| EP | 2746501 A2 | 6/2014 |
| JP | 2012107449 A | 6/2012 |
| JP | 2013040462 A | 2/2013 |
| JP | 2015192480 A | 11/2015 |
| WO | 2004017424 A2 | 2/2004 |
| WO | 2010144637 A1 | 12/2010 |
| WO | 2013026944 A1 | 2/2013 |
| WO | 2013086265 A1 | 6/2013 |
| WO | 2015110254 A1 | 7/2015 |
| WO | 2016020670 A2 | 2/2016 |
| WO | 2016192848 A2 | 12/2016 |
| WO | 2017007467 A1 | 1/2017 |

* cited by examiner

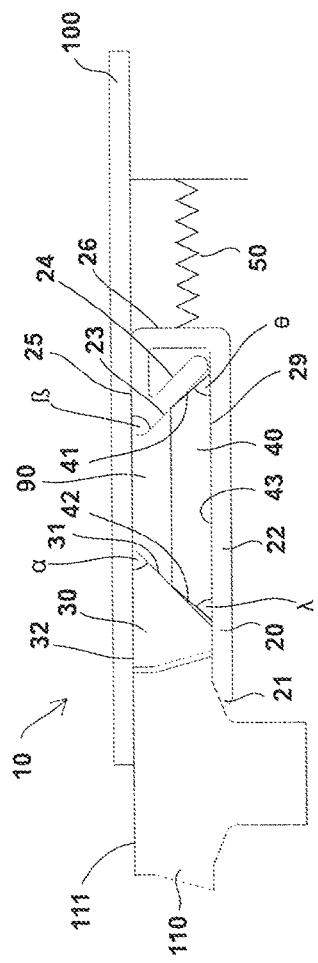
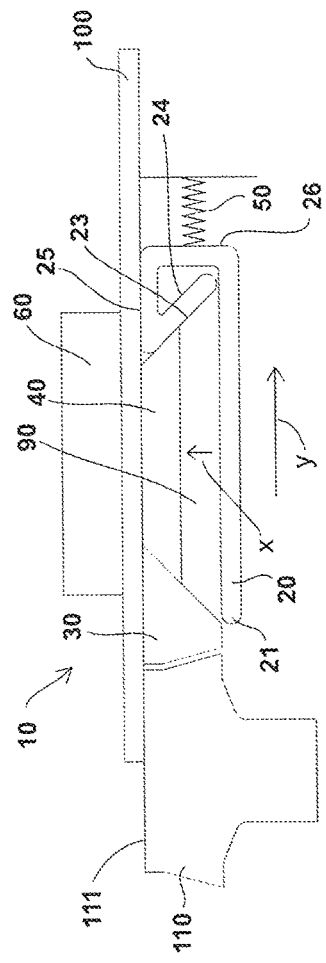

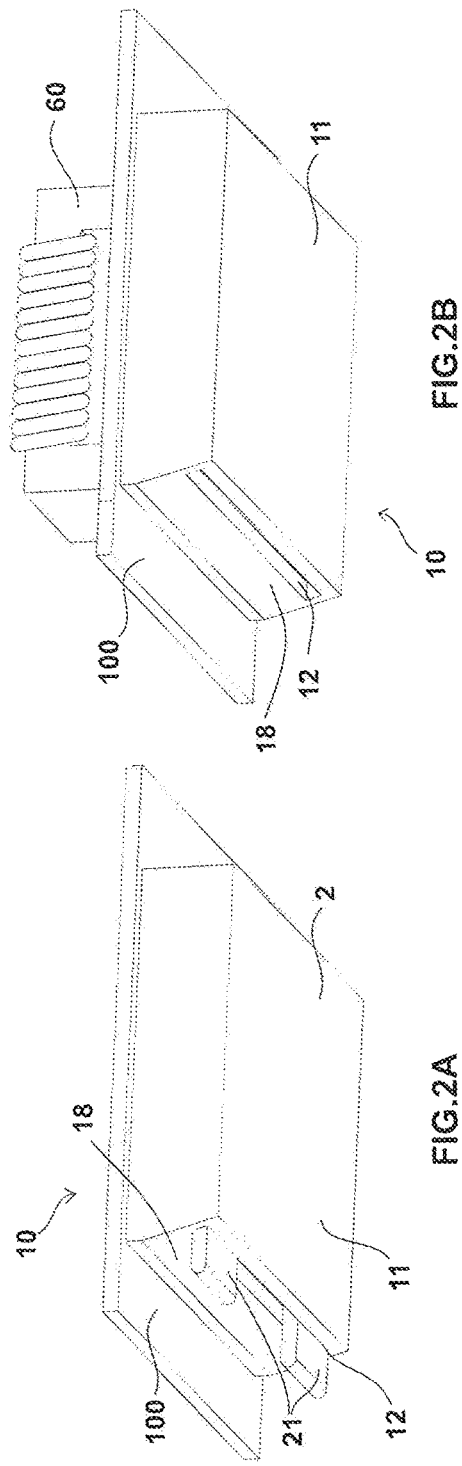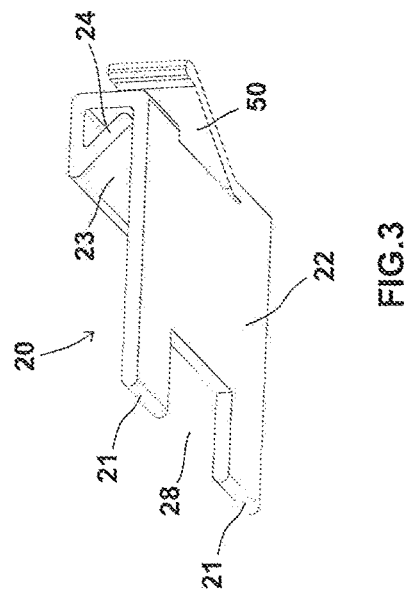

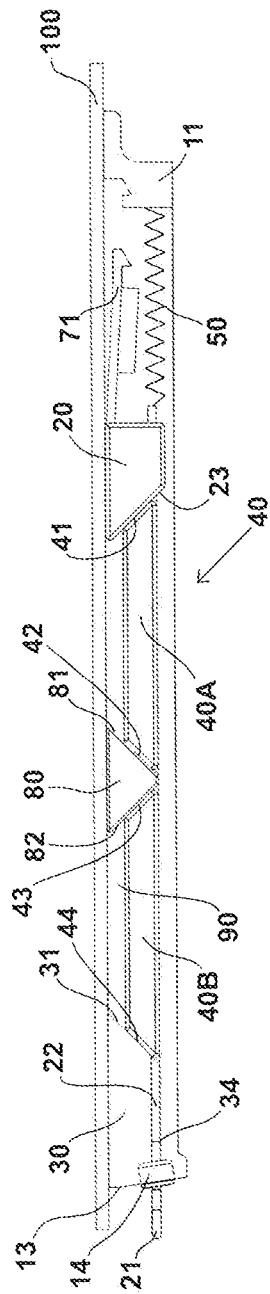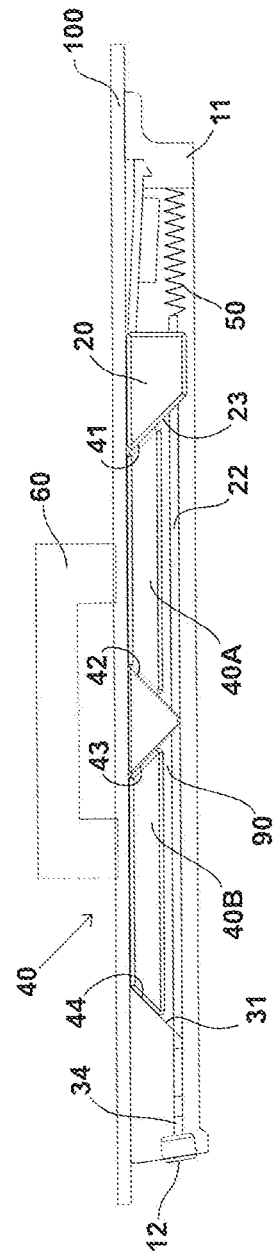

MAGNETICALLY-CONTROLLED CONNECTORS AND METHODS OF USE

BACKGROUND

The present application is directed to connectors and, more particularly, to connectors that are movable between engaged and disengaged positions to secure a panel to a support member.

Connectors are used in a variety of different applications to connect a first member to a second member. The connectors may be attached to a first member in a variety of different manners. The connectors may be adjustable between a locked position in which the first member is secured to the second member, and an unlocked position in which the first member is not secured to the second member.

The connectors may be positioned on the first member in a manner such that they are not easily accessible. This may occur when the connector is positioned along a back side of the panel in a position that is difficult to access when positioned at the second member. This may make securing the connectors to the second member difficult due to the lack of access. For instance, a connector on the back side of a solar panel may not be accessible to an installer once the solar panel is positioned on the top of a frame. Likewise, a connector on a back of a plywood panel may not be accessible once the panel is placed against wall studs.

SUMMARY

The present application is directed to connectors for connecting a panel to a support member. One aspect is directed to a connector to connect a panel to a support member with the connector including a first member with a first ramped contact surface and an outwardly-extending elongated arm that terminates at a distal end. A second member includes a second ramped contact surface that faces towards the first ramped contact surface. A holding space is formed between the first and second ramped contact surfaces with the holding space including a width measured between the first and second ramped contact surfaces. The holding space is tapered with a width that is greater at a first section of the holding space and smaller at an opposing second section of the holding space due to arrangement of the first and second ramped contact surfaces. The connector also includes a biasing member that biases the first member towards the second member and a ferromagnetic wedge positioned in the holding space between the first and second members with the wedge having an elongated shape with opposing first and second ends. The ferromagnetic wedge is sized to move within the housing between a first position and a second position. The first position includes the ferromagnetic wedge positioned at the first section of the holding space and in contact with each of the first and second members to space the first member away from the second member a first distance such that the distal end of the arm extends outward beyond the second member to engage the support member. The second position includes the ferromagnetic wedge positioned at the second section of the holding space and in contact with each of the first and second members to space the second member away from the second member a second greater distance such that the distal end of the arm is positioned in closer proximity to the second member to disengage from the support member.

The connector may also include a housing that extends around the first and second members and the biasing member with the housing including an opening through which the distal end of the elongated arm extends in the first position. The connector may include the second member being fixed relative to the housing and the first member being movable relative to the housing.

The connector may include that the arm forms an edge of the first section of the holding space and the wedge contacts against the arm in the first position.

The connector may also include a latch connected to the first member with the latch including an elongated arm that extends outward from the first member away from the second member and includes a catch at a distal end. The latch may include a ferromagnetic member attached to the arm between the distal end and the first member.

The connector may also include that each of the first and second ends of the wedge are ramped at an acute angle relative to a bottom of the wedge. The acute angle of each of first and second ends may be the same.

The connector may include that the wedge has first and second wedge sections and an intermediate member with each of the first and second sedge sections and the intermediate member having outer ends with ramped surfaces.

The connector may include a housing and each of the first member, the first and second wedge sections, and the intermediate member may be movable relative to a housing, and that the second member may be fixed relative to the housing.

Another aspect is directed to a connector to connect a panel to a support member. The connector includes a housing configured to be attached to the panel with the housing having an opening that extends through an exterior wall. A first member is movably positioned relative to the housing with the first member including a first ramped contact surface and an outwardly-extending arm that terminates at a distal end. A second member is fixedly positioned relative to the housing with the second member including a second ramped contact surface that faces towards the first ramped contact surface. A biasing member biases the first member towards the second member. A ferromagnetic wedge is positioned between the first and second members with the wedge having an elongated shape with opposing first and second ends with the first end being ramped and that faces towards the first ramped contact surface of the first member and the second end being ramped and that faces towards the second ramped contact surface of the second member. The ferromagnetic wedge is sized to move within the housing between a first position when not acted on by a magnet and a second position when acted on by the magnet. The first position includes the ferromagnetic wedge in contact along a first portion of each of the first and second ramped contact surfaces to space the first member away from the second member a first distance such that the distal end of the arm extends outward through the opening in the housing. The second position includes the ferromagnetic wedge in contact along a second portion of each of the first and second ramped contact surfaces to space the first member away from the second member a second greater distance such that the distal end of the arm is retracted within the opening in the housing.

The connector may include that the arm of the first member extends underneath and contacts against the second member.

The connector may also include a latch connected to the first member with the latch having an elongated arm that extends outward from the first member away from the second member and includes a catch at a distal end. The latch may also include a ferromagnetic member attached to the arm between the distal end and the first member. The connector may also include a receptacle formed in the housing and shaped to receive the catch at the distal end of the arm when the latch is secured to the housing.

The connector may include that the wedge has a bottom and each of the first and second ends are aligned at acute angles relative to the bottom.

The connector may also include that the arm has first and second sections that are laterally spaced apart across a width of the arm.

Another aspect is directed to a method of attaching a panel to a support member. The method includes: positioning a wedge between first and second contact members with a first end of the wedge in contact against a first section of the first contact member and a second end of the wedge in contact against a first section of the second contact member; spacing the first and second contact members apart a first distance and engaging a distal end of an arm that extends outwardly from the first contact member with the support member; moving a magnetic actuator into proximity of the wedge and magnetically attracting the wedge towards the magnetic actuator; moving the wedge along each of the first and second contact members from the first sections of the first and second contact members to second sections of the first and second contact members; and in response to moving the wedge, separating apart the first and second contact members and retracting the distal end of the arm and disengaging the arm from the support member.

The method may also include biasing the first and second contact members together.

The method may also include moving the wedge along each of the first and second contact members from the first sections of the first and second contact members to the second sections of the first and second contact members comprises sliding the wedge along each of the first and second contact members.

The method may include magnetically attracting a ferromagnetic member on an arm of a latch and disengaging a catch of the arm from a receptacle in a housing prior to extending the distal end of the arm outwardly and engaging the support member.

The method may include extending the distal end of the arm outwardly beyond a housing when the wedge contacts against the first sections of the first and second contact members and retracting the distal end inward into the housing when the wedge contacts against the second sections of the first and second contact members.

The various aspects of the various embodiments may be used alone or in any combination, as is desired.

BRIEF DESCRIPTION OF THE DRAWINGS

FIG. 1A is a schematic side view of a connector in a locked position.

FIG. 1B is a schematic side view of a connector in an unlocked position.

FIG. 2A is a schematic side view of a connector in a locked position.

FIG. 2B is a schematic side view of a connector in an unlocked position.

FIG. 3 is a perspective view of a support member.

FIG. 7A is a schematic side view of a connector in a locked position.

FIG. 7B is a schematic side view of a connector in an unlocked position.

DETAILED DESCRIPTION

Figure 4:
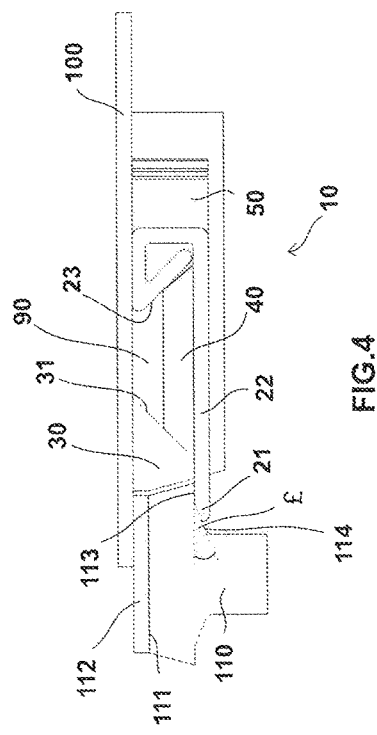
FIG. 4 is a schematic side view of a connector in a locked position.

The present application is directed to a magnetically-controlled connector for attaching a panel to a support member. The connector is attached to the panel and is configurable between locked and unlocked positions. In the locked position, an arm extends outward to engage with the exterior support member. In the unlocked position, the arm is retracted inward and is disengaged from the support member. The connector is configured to be movable between the positions using a magnetic actuator that is selectively moved into and out of proximity of the connector.

FIGS. 1A and 1B illustrate a connector 10 that is attached to a panel 100. The connector 10 is connected to an underside of the panel 100 and configured to engage with an exterior support member 110. The connector 10 includes a movable support 20 that is movably attached to the panel 100, a fixed support 30 that is fixedly attached to the panel 100, a wedge 40 positioned between the supports 20, 30, and a biasing member 50.

A holding space 90 is formed between the supports 20, 30. The holding space 90 is sized to hold the wedge 40. In use, the connector 10 is forced towards the locked position by the biasing member 50 as illustrated in FIG. 1A. This includes a distal end 21 of the movable support 20 extending outward to engage with the support member 110. The wedge 40 is positioned in a lower section of the holding space 90 away from the panel 100 to contact against lower sections of the supports 20, 30 and space them apart by a first distance.

To move the connector 10 to the locked position as illustrated in FIG. 1B, a magnetic actuator 60 is brought into proximity to the wedge 40. This may include positioning the actuator 60 against the top surface of the panel 100 as illustrated in FIG. 1B. The actuator 60 magnetically attracts the wedge 40 in the direction of arrow X towards an upper section of the holding space 90. This upward movement causes the wedge 40 to slide against the supports 20, 30. The shapes of the wedge 40 and supports 20, 30 cause the movable support 20 to move away from the fixed support 30 in the direction of arrow Y. This movement causes the distal end 21 to move away from and disengage from the fixed support 110.

To return the connector 10 to the locked position, the actuator 60 is removed from proximity of the wedge 40. This removes the magnetic force thus causing the wedge 40 to move downward towards the lower section of the holding space 90.

A first element of the connector 10 is the support 20. The support 20 includes a contact section 24 and an elongated arm 22. The contact section 24 includes a top surface 25 that contacts against and moves along the underside of the panel 100. A contact surface 23 is positioned proximate to the top surface 25 and is positioned to contact against the wedge 40. The contact surface 23 is oriented at an angle ß relative to the top surface 25. One aspect includes the angle ß being an acute angle. The contact section 24 also includes a surface 26 against which the biasing member 50 applies the biasing force.

The connector 10 also includes an elongated arm 22 that extends outward from the contact section 24 and terminates at the distal end 21. The arm 22 may form a lower boundary of the holding space 90. The arm 22 may extend under the wedge 40 and support the wedge 40 in the unlocked position.

The support 30 is fixedly attached to the panel 100 and contacts against the wedge 40. The support 30 includes a top surface 32 that is attached to the panel 100 and a contact surface 31 that is contacted by the wedge 40. The contact surface 31 may be positioned at an angle α relative to the top surface 32. The angle α is an acute angle and may or may not be the same as angle ß. The support 30 may also be contacted by the arm 22 of the support 20 in one or both of the locked and unlocked positions.

The holding space 90 is formed between the supports 20, 30. The holding space 90 includes a width measured between the contact surfaces 23, 31. The width varies along the holding space 90 due to the angular orientation of the surfaces 23, 31. The width is smaller at the upper section of the holding space 90 in proximity to the panel 100 and larger at the lower section. The size of the holding space 90 varies due to the movement of the support 20.

The wedge 40 is positioned within the holding space 90 and contacts against each of the supports 20, 30. The wedge is constructed from a ferromagnetic material that is magnetically attracted to the magnetic actuator 60. This may include the wedge 40 being constructed from various materials, including but not limited to iron, cobalt, and nickel, and mixtures thereof. The wedge 40 includes an elongated shape with bottom surface 43 that faces away from the panel 100 and opposing ends 41, 42. The first end 41 contacts against the support 20 and the second end 42 contacts against the support 30. The ends 41, 42 include ramped surfaces that may or may not match those of the respective contact surfaces 23, 31. The first end 41 is positioned at an acute angle θ relative to the bottom surface 43, and the second end 42 is positioned at an acute angle λ relative to the bottom surface 43. The ramped end 41 is configured to engage with and slide along the contact surface 23 of the member 20 and ramped end 42 is configured to engage with and slide along the contact surface 31. The ends 41, 42 may be ramped at the same or different angles. Aspects may include the first end 41 having the same angle as the contact surface 23 (i.e., ß=13) and/or the second end 42 having the same angle as contact surface 31 (i.e., A=a). In one aspect, the respective angles are the same.

The biasing member 50 applies a force to the movable support 20 to force the connector 10 towards the locked position. The biasing member 50 may include a variety of different structures, such as but not limited to a spring, cantilevered arm that extends from the arm 20, and foam material. The biasing member 50 may include a single element (e.g., a single spring) or multiple elements (e.g., multiple springs).

The actuator 60 magnetically attracts the wedge 40 to move the wedge 40 from a first position at the lower section of the holding space 90 to a second position that along the upper section of the holding space 90. The actuator 60 may comprise a variety of different magnets.

In use, the connector 10 is biased towards the locked position. This includes the biasing member 50 applying a force to the movable support 20 that forces it towards the support member 110. Without the actuator 60 in proximity as illustrated in FIG. 1A, the ramped wedge ends 41,42 and corresponding contacts surfaces 23, 31 cause the wedge 40 to be positioned in the lower section of the holding space 90. This may include the wedge 40 being positioned against the arm 22 of the support 20. The length of the wedge 40 measured between the ends 41, 42 positions the movable support 20 a distance from the fixed support 30 such that the distal end 21 of the arm 22 extends outward to engage with the support member 110. In this locked position, the end 41 of the wedge 40 remains in contact with the contact surface 23 and end 42 remains in contact with the contact surface 31.

To move the connector 100 to the unlocked position, the actuator 60 is brought into proximity of the wedge 40 as illustrated in FIG. 1B. This positioning causes the wedge 40 to be magnetically attracted to the actuator 60. The force of the wedge 40 being magnetically attracted towards the actuator 60 overcomes the force applied by the biasing member 50. The magnetic force causes the ramped ends 41, 42 to slide along the corresponding surfaces 23, 31 to an upper section of the holding space 90. This movement of the wedge 40 causes the movable support 20 to move away from the fixed support 30. This movement results in the distal end 21 of the arm 20 retracting inward against the biasing force of the biasing member 50 and disengaging from the support member 110. In the unlocked position, the end 41 remains in contact with the contact surface 23 and end 42 remains in contact with the contact surface 31.

While in the unlocked position, the panel 100 can be positioned relative to the support member 110. Once positioned at the appropriate location, the actuator 60 is removed causing the connector 10 to return to the locked position and engage with the support member 110.

FIG. 2A illustrates a connector 10 attached to a panel 100 and in a locked position. FIG. 2B illustrates the connector 10 in an unlocked position due to the proximity of the actuator 60. The connector 10 includes an outer housing 11 that extends around the components. The housing 11 includes exterior walls 18 that extend around the components, and an opening 12 through which the distal end 21 of the arm 20 extends in the locked position (see FIG. 2A). A seal may be positioned at the opening 12 in the housing 11. This seal contacts against side of the support member 110 to again prevent the ingress of water and/or debris.

FIG. 3 illustrates a movable support 20 that is constructed from a sheet, such as a thin metal. One end of the sheet is folded to form the contact section 24 that includes the contact surface 23 that contacts against the wedge 40. The sheet is further cut to form a cantilevered extension that extends outward from the contact section 24 to form the biasing member 50. The elongated arm 22 extends from the contact section 24 and terminates at the distal end 21. The arm 22 includes a pair of projections that are separate by a notch 28. The notch 28 is sized to extend around the support 30 that is fixedly positioned in the housing 11.

FIG. 4 illustrates the connector 10 in a locked position with the distal ends 21 of the arm 22 engaged with the support member 110. The wedge 40 is positioned in a lower portion of the holding space 90 and in contact with each of the contact edges 31, 23. The biasing member 50 applies a force that moves the wedge 40 downward against the arm 22 of the movable support 20.

The support member 110 is configured to engage with the connector 10 and support the panel 100. As illustrated in FIG. 4, the support member 110 includes a top surface 111 configured to support the edge of the panel 100. Each of the top surface 111 and underside of the panel 100 may be flat to facilitate the contact. A seal 112 may be positioned at the top surface 111 to contact against the underside of the panel 100. The seal 112 may be constructed from a flexible material that forms a water-tight seal to prevent the ingress of water and/or debris.

The support member 110 may also be configured to facilitate the engagement with the connector 10 in the locked position. As illustrated in FIG. 4, the member 110 includes a first surface 113 that contacts against the distal end 21 and adjacent top surface of the arm 22. This contact locks the connector 10 and attached panel 100 to the support member 110. This first surface 113 may be relatively flat to facilitate contact and engagement with the flat top of the arm 22. A second surface 114 is positioned inward from the first surface 113. The second surface 114 is positioned at an acute angle £ relative to an inward projection of the first surface 113. This angle £ causes the arm 22 to apply a downward force that secures the contact between the underside of the panel 100 and the seal 112.

In one aspect when the connector 10 is engaged with the member 110, the wedge 40 is not fully seated. That is, there is additional room for the wedge 40 to move within the holding space. This causes a continuous bias on the support 20 thus creating a force applied to the member 110 by the arm 22. This force causes the panel 100 to be pulled onto the support 110. This force compresses the seal 112 to maintain a watertight connection to prevent the ingress of water and/or debris over time that could occur due to weather including wind and temperature changes.

Figure 5:
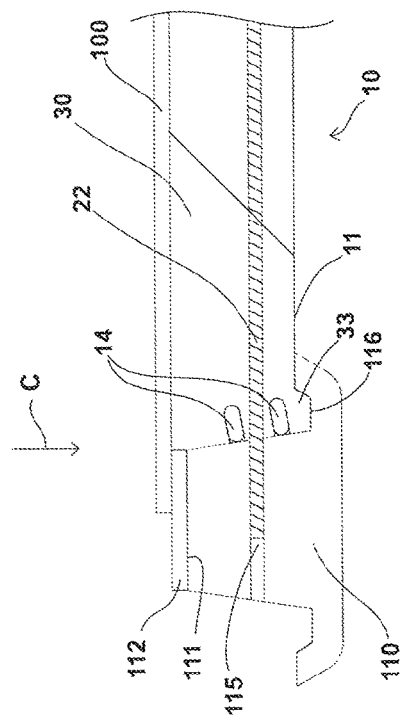
FIG. 5 is a schematic side view of a connector in a locked position.

FIG. 5 includes the support member 110 having a notch 116 formed to receive a lip 33 on the underside of the housing 11. When the connector 10 and panel 100 are positioned against the support member 110 in the direction indicated by arrow C, the lip 33 is received in the notch 116. Once received, the connector 10 can be moved to the locked position with the distal end 21 of the arm 22 inserted into a slot 115 in the support member 110.

FIGS. 6A, 6B, 7A, and 7B illustrate another aspect of the connector 10. As illustrated, the connector 10 uses a multiple member wedge 40 configuration to move between engaged and disengaged positions. In one aspect, the connector 10 is attached to a solar panel 100 (not illustrated in FIGS. 6A, 6B, 7A, 7B) and used to electrically connect to an adjacent solar panel 100. The connector 10 includes a housing 11 that extends around and protects the other components. The bottom of the housing 11 is removed in FIGS. 6A and 6B for clarity.

Figure 6A:
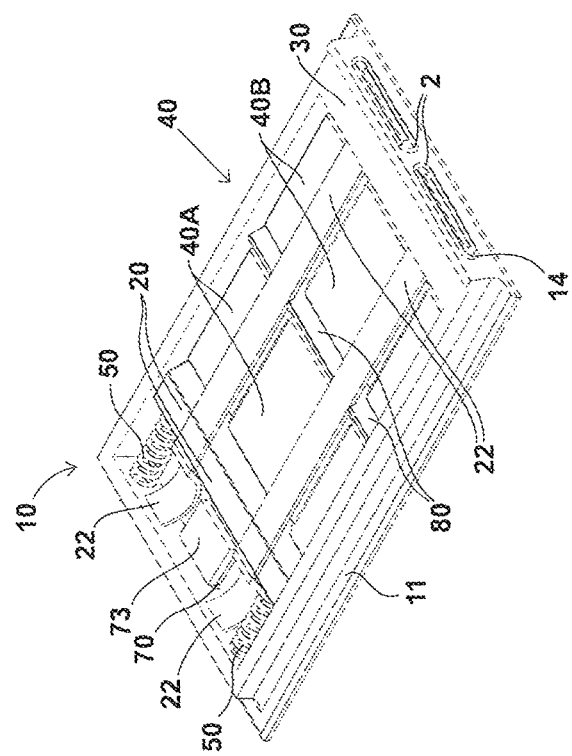
FIG. 6A is a perspective bottom view of a connector in a locked position.
Figure 6B:
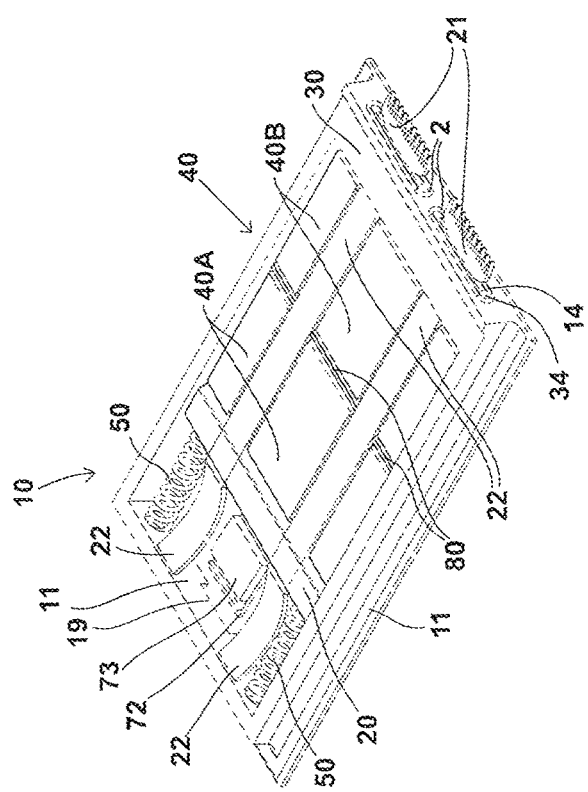
FIG. 6B is a perspective bottom view of a connector in an unlocked position.

The connector 10 includes a pair of arms 22 that are movable between an extended orientation in the locked position as illustrated in FIGS. 6A and 7A, and a retracted orientation in the unlocked position of FIGS. 6B and 7B. The arms 22 are constructed from an electrically conductive material and engage with adjacent solar panels 100 in the locked position. Electrical connectors may be connected to the inner ends of the arms 22 to provide for electrical connections with the solar cells of the solar panel. The arms 22 may be electrically isolated within the connector 10. This may include an insulating material positioned underneath the arms 22 to provide electrical isolation. The arms 22 may also include extendable portions positioned between the support 20 and a back of the housing 11 (see FIGS. 6A, 6B). The extendable portions provide for maintaining electrical connection when the remainder of the arms 22 move between the locked and unlocked positions. Aspects may include a hinged configuration with an extendable length, a bowed configuration that is extendable and retractable, and a folded/pleated configuration.

The arms 22 are attached to the movable contact member 20. Thus movement of the contact member 20 results in movement of the arms 22. The contact member 20 includes a ramped contact surface 23 (see FIGS. 7A, 7B). A pair of biasing members 50 contact against the contact member 20 to apply a biasing force.

The fixed support 30 is positioned in the housing 11 and spaced away from the movable contact member 20. The fixed support 30 includes a ramped contact surface 31 that faces towards the contact member 20. In one aspect, the fixed support 30 is formed by the housing 11. Slots 34 extend through the fixed support 30 to receive the arms 22. The slots 34 are sized to allow the arms 22 to move back and forth between the locked and unlocked positions.

This aspect of the connector 40 includes a multiple-section wedge 40 that is positioned in the holding space 90 between the members 20, 30. The wedge 40 includes first and second wedge sections 40A, 40B and an intermediate member 80. The wedge sections 40A, 40B are constructed from a ferromagnetic material and are magnetically attracted to the magnetic actuator 60. The first wedge section 40A is positioned in proximity to the movable support 20, and the second wedge section 40B is positioned in proximity to the fixed support 30. Each wedge section 40A, 40B includes front and back ends that are ramped. Wedge section 40A includes ends 41, 42 and wedge section 40B includes ends 43, 44 (FIGS. 7A, 7B). The angles of the ends of each wedge section 40A, 40B may be the same or different. Likewise, the wedge sections 40A, 40B may include the same or different shapes and/or sizes.

The intermediate contact member 80 is positioned between the first and second wedge sections 40A, 40B. The intermediate contact member 80 moves relative to the housing 11 as the wedge sections 40A, 40B move between the locked and unlocked positions. The intermediate contact member 80 includes a pair of ramped surfaces 81, 82. The first ramped surface 81 contacts against the end 42 of the first wedge section 40A and the second ramped end 82 contacts against the end 43 of the second wedge section 40B.

FIGS. 6A and 7A illustrate the connector 10 in the locked position. The connector 10 is attached to an underside of a panel 100 with the arms 22 electrically connected to the panel. One aspect includes the connector 10 used with a solar panel 100, with other aspects including other types of panels 100 that require electrical and/or physical connection to a support member 110. Another aspect is the panel including internal electrical wiring that is connected to the arms 22.

In the locked position, the distal ends 21 of the arms 22 extend outward from the housing 11. This provides for the distal ends 21 to engage with the support member 110 and/or electrical connectors that are associated with the support member 110. Seals 14 are attached to the housing 11 where the arms 22 extend outward. When the connector 10 is abutted against the support member, the seals 14 prevent the ingress of water and/or debris.

In the locked position, the biasing members 50 apply a force that is distributed to the movable support 20 and wedge 40. This force and the angle of the ramped ends of the various surfaces that in contact forces the wedge sections 40A, 40B towards a lower section of the holding space 90. That is, the angle of surface 23 against edge 41, surface 42 against edge 81, surface 82 against edge 43, and edge 31 against edge 44 forces the wedges 40A, 40B downward. The arms 22 that are attached to the movable support 20 extend outward from the housing 11.

FIGS. 6B and 7B illustrate the connector 10 in the unlocked position. FIG. 7B includes an actuator 60 that creates a magnetic force on the wedges 40. The actuator 60 is not illustrated in FIG. 6B for clarity.

When the magnetic actuator 60 is moved into proximity of the connector 10, a magnetic force acting on the wedge sections 40A, 40B draws the wedge sections 40A, 40B towards the actuator 60. This force causes the wedge sections 40A, 40B to move upward in the holding space 90 and the ramped ends of the wedges (ends 41, 42 of the wedge section 40A, ends 43, 44 of the wedge section 40B) to slide along the corresponding surfaces. The wedge sections 40A, 40B include a fixed length and thus the upward movement causes the movable contact member 20 to move laterally away from the support 30 (i.e., move to the right as illustrated in FIG. 7B). As the arms 22 are attached to the movable contact member 20, this results in the arms 22 also moving laterally. This results in the distal ends 21 of the arms 22 being moved into the openings 12 and disengaging from the adjacent support member.

Figure 8A:
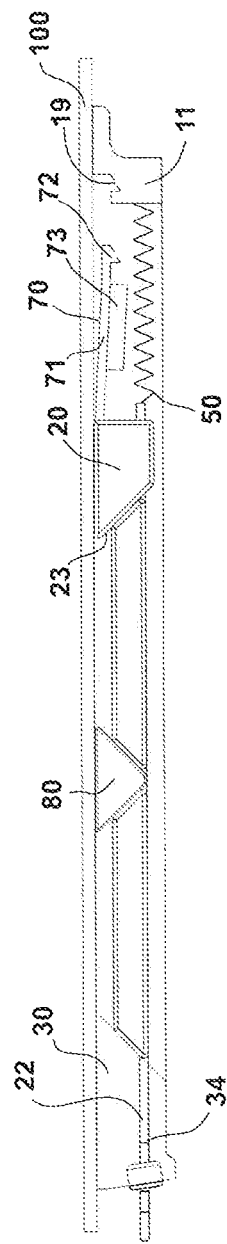
FIG. 8A is a schematic side view of a connector with a latch in a locked position.
Figure 8B:
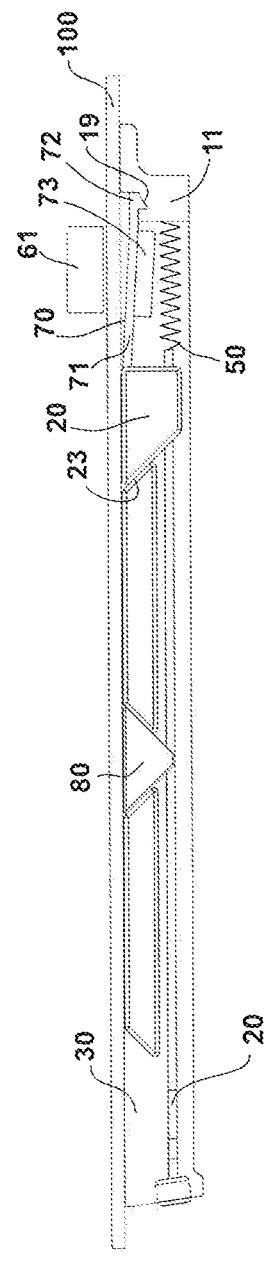
FIG. 8B is a schematic side view of a connector with a latch in an unlocked position.

As illustrated in FIGS. 8A and 8B, the connector 10 may also include a latch 70 to maintain the connector 10 in the unlocked position. The latch 70 secures the connector 10 in the locked position. The latch 70 may be initially used prior to the panel 100 being attached to the support member 110, such as prior to initial installation. The latch 70 maintains the distal end 21 of the arm 22 retracted inward to prevent potential damage to the arm 22 that may occur during handling. The latch 70 also positions the arm 22 to prevent accidental connection with an electrical source that could pose a hazard to the user.

The latch 70 includes an elongated arm 71 that extends outward from the movable support 20. The arm 71 extends outward in a direction away from the fixed support 30. The exposed distal end of the arm 71 includes a catch 72 with a tapered width that narrows towards the end. A ferromagnetic member 73 is attached to the arm 71 in proximity to the catch 72. One aspect as included in FIGS. 8A and 8B include the member 73 attached to a bottom side of the arm 71. Member 73 may also be attached to other sections of the arm 71.

The housing 11 includes a corresponding receptacle 19. The receptacle 19 is shaped to contact against the catch 72 and includes an open top side such that the catch 72 can be inserted from the top.

As illustrated in FIG. 8B, the latch 70 in the locked position includes the catch 72 positioned in the receptacle 19. This maintains the movable support 20 in a retracted position such that the distal end 21 of the arm 22 is not exposed beyond the end of the housing 11. To release the latch 70, an actuator 61 as illustrated in FIG. 8B is moved into proximity. The actuator 61 magnetically attracts the ferromagnetic member 73 that is attached to the arm 71. This force causes the arm 71 to move upward and to disengage the catch 72 from the receptacle 19. Once the catch 72 is removed, the force of the biasing members 50 forces the movable support 20 away from the back of the housing 11. This positions the connector 10 in the engaged position with the distal end 21 outward beyond the front of the housing 11 as illustrated in FIG. 8A.

One aspect of use includes the connector 10 being in the unlocked position as illustrated in FIG. 8B. The actuator 61 is brought into proximity to attract the member 73 causing the arm 71 to move towards the actuator 61 and for the catch 72 to disengage from the receptacle 19. The biasing member 50 then applies a force to the member 50 to move the connector 10 to the locked position.

To unlock the connector 10, the actuator 60 is brought into proximity with the wedge 40. This causes the member 20 to be moved to retract the distal end 21 of the arm 22 inward. Further, actuator 61 is applied to the latch 70. The catch 72 at the distal end of the arm 71 is aligned with the receptacle 19 in the housing 11. In one aspect, the catch 72 disengages with the receptacle 19 with the actuator 61 in proximity to the latch 70 and allows the connector 10 to move to the locked position. Another aspect includes removal of the actuator 61 which provides for the catch 72 to engage with the receptacle 19 and maintain the connector 10 in the unlocked position.

The aspects described above include the wedge 40 each having a pair of ramped ends. Other aspects may include wedges 40 with just a single end with a ramped shape. In one aspect, the non-ramped end may form a perpendicular angle with the bottom surface. Likewise, aspects may include just a single one of the movable contact member 20 or the fixed contact member 30 having an acute angled contact face.

The connector 10 provides for mechanical and/or electrical connection with the support member or other adjacent panel. As such, the connector 10 may be used with a wide variety of different types of panels. These include but are not limited to solar panels, wall panels, and sheetrock panels. One aspect includes a solar panel configured to obtain usable solar power through photovoltaics. The panels generally include solar cells that absorb and convert sunlight into electricity, various electrical contacts and cabling, and various electronics such as an inverter to change the electric current from DC to AC. Panels may also include large planar members constructed from wood, metal, plastic, glass, sheetrock, etc. The panels may have a variety of sizes from a relatively small panel that has width and length dimensions in the inches, to relatively large sizes that have dimensions that are in the feet.

Support members are configured to receive and support the panels. The support members may include a frame with a surface configured to contact against and support the panel. The frame may extend around a limited section or the entirety of the panel. The support members are positioned behind the panels such that the panels rest upon or abut against the support members.

Figure 9:
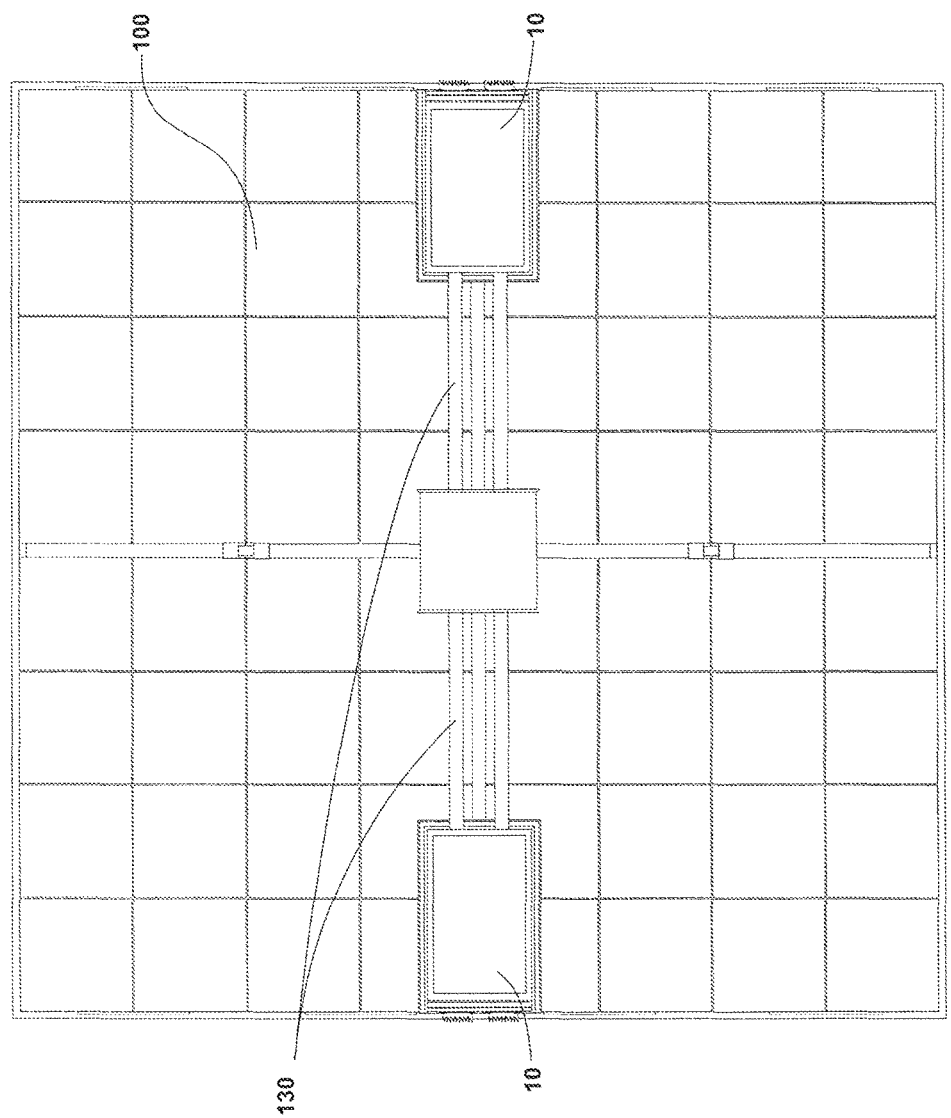
FIG. 9 is a bottom view of a solar panel with two connectors.
Figure 10:
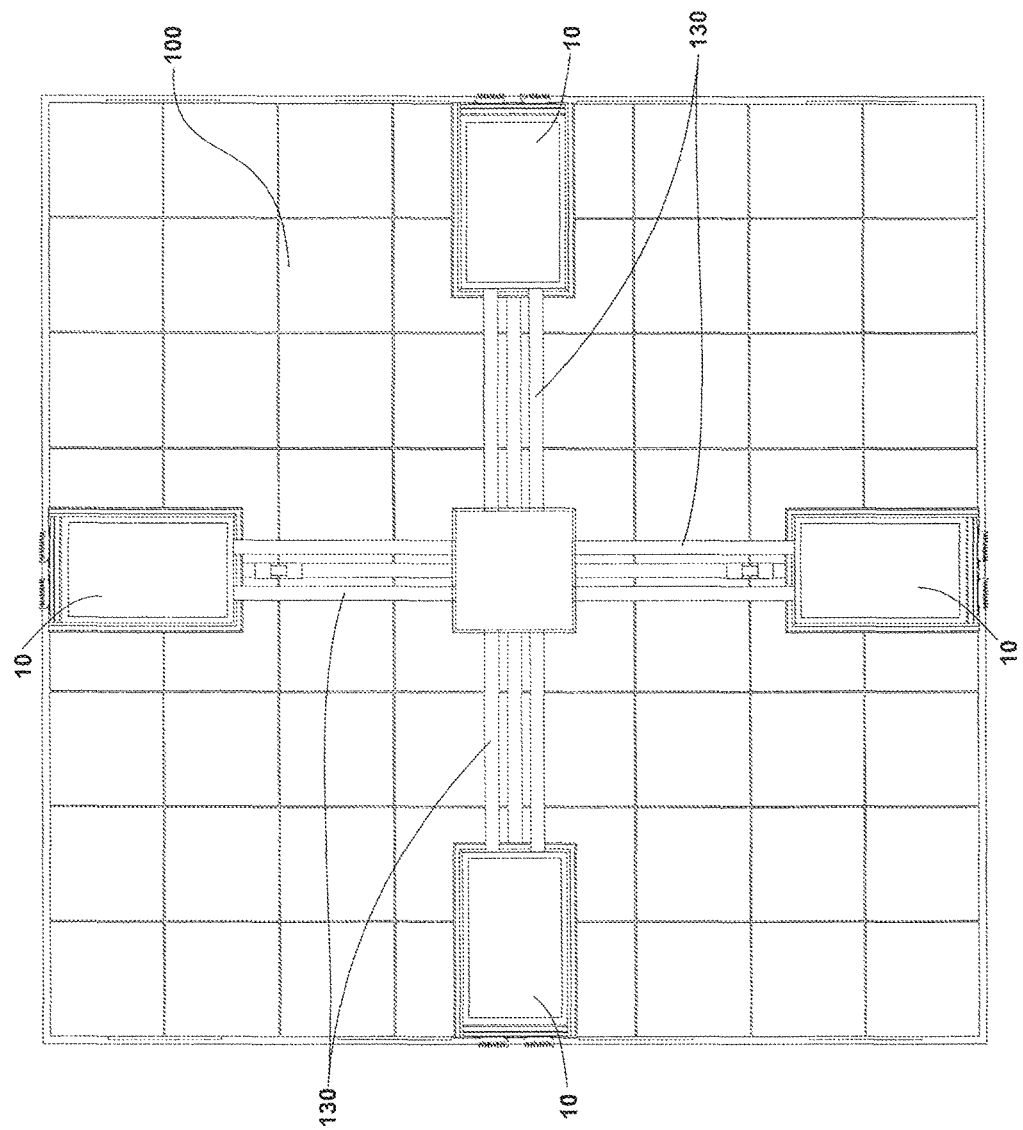
FIG. 10 is a bottom view of a solar panel with four connectors.

Panels 100 may include different numbers of connectors 10. FIG. 9 illustrates a solar panel 100 that includes a pair of connectors 10 on opposing sides. Solar cells along the panel 100 are connected via electrical connections 130 to the connectors 10. The connectors 10 provide a way to electrically connect the panel 100 to exterior components, such as adjacent panels 100, electrical components, and electrical networks. FIG. 10 illustrates a solar panel 100 with four connectors 10 attached to the underside.

Figure 11:
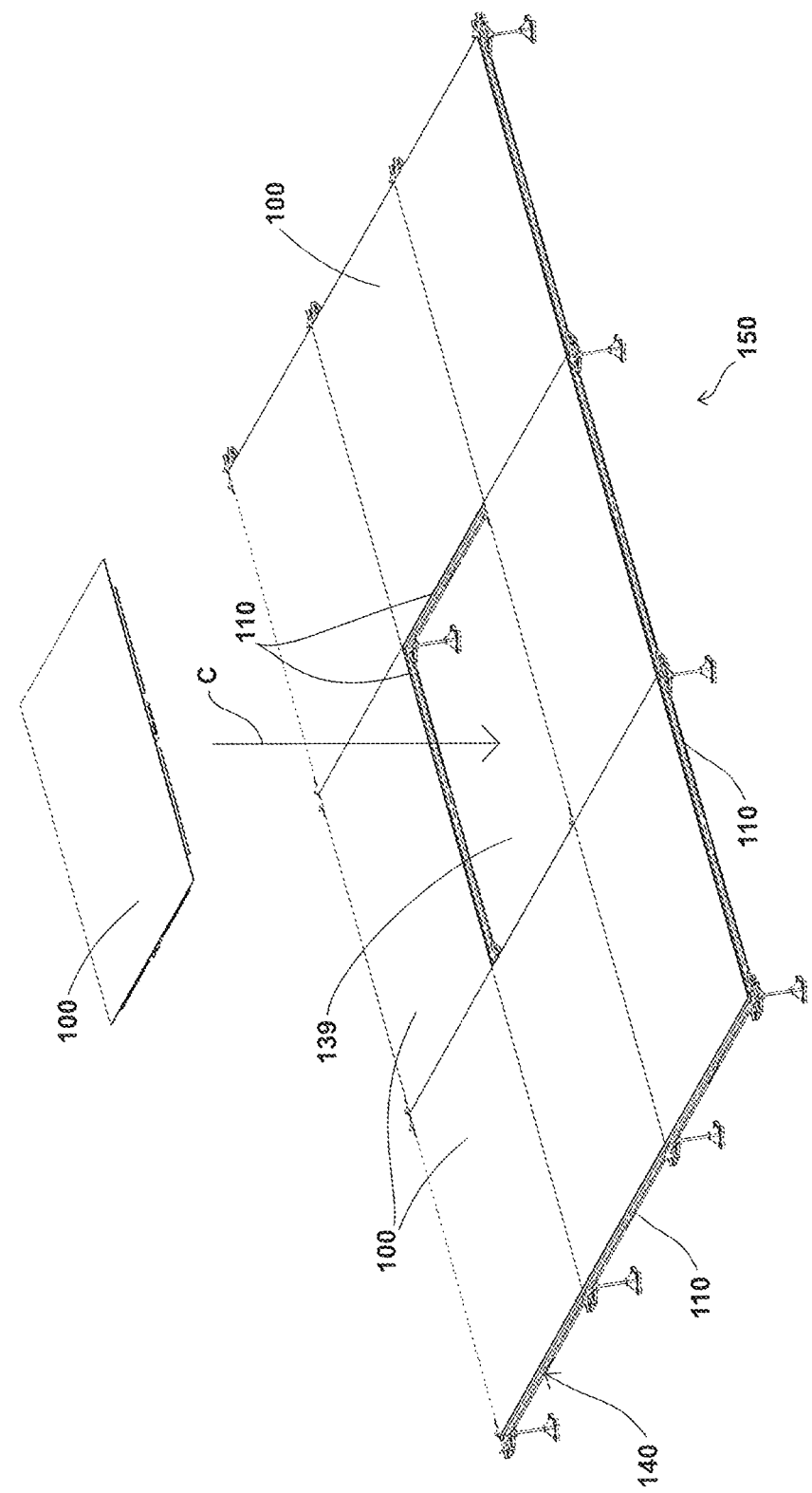
FIG. 11 is a perspective view of a solar array with one panel being exploded outward from the array.

One aspect includes the connectors 10 for use with solar panels 100 that are a component in a larger solar array 150. FIG. 11 includes a solar array 150 that includes nine solar panels 100 aligned in a 3×3 grid. The solar array 150 includes a frame 140 constructed from support members 110. The frame 140 forms receptacles 139 each configured to position the solar panels 100 in the desired configuration. FIG. 11 includes one of the solar panels 100 removed from the receptacle 139 to view the underlying frame 140 constructed from the support members 110.

The solar panels 100 are planar members that include a series of interconnected solar cells. The solar cells use light energy from the sun to generate electricity through the photovoltaic effect. The solar cells may include various structures, including but not limited to wafer-based crystalline silicon cells or thin-film cells based on cadmium, telluride or silicon. The solar panels 100 may include a variety of different shapes and sizes. In one aspect as illustrated, the panels 100 are rectangular with opposing lateral sides and opposing ends.

The solar cells are electrically connected to the electrical connectors 130 (FIGS. 9, 10). As illustrated, the electrical connectors 130 may extend along the bottom side of the panels 100 and connect to the connectors 10.

The array 150 is configured for the panels 100 to be inserted and removed from above the frame 140. As illustrated in FIG. 11 (and FIG. 5), the panels 100 are inserted in a direction C that is perpendicular to a plane formed by the solar panels 100 on the frame 140. Once inserted, the one or more connectors 10 on the panel 100 are extended to engage with the one or more support members 110.

Figure 12:
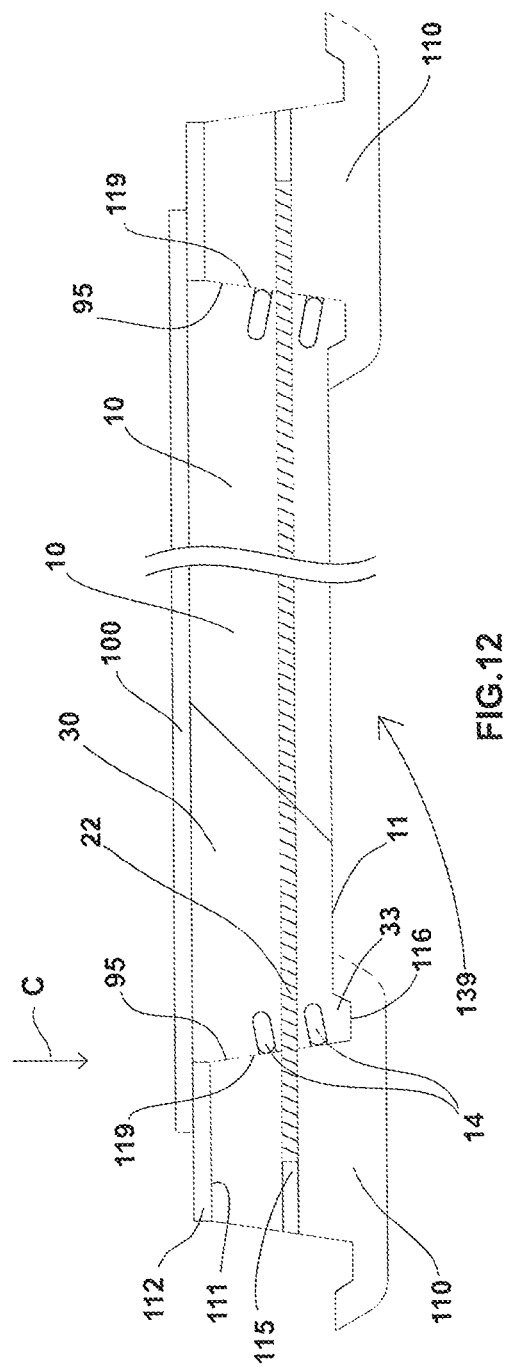
FIG. 12 is a schematic side view of a solar panel with opposing connectors that each engage with corresponding support members.

The support members 110 may be configured to receive one or more panels 100. As illustrated in FIG. 12, the panel 100 rests on a portion of the top 111 of the member 110. The top 111 is sized such that the support member 110 can receive an adjacent panel 100 that contacts against and rests on the remainder of the top 111. In one aspect, each of the panels 100 rests on the seal 112 positioned on the top 111 of the support member 110. This positions the panels 100 in a side-by-side arrangement as illustrated in FIG. 11.

The connectors 10 and the support members 110 are configured to facilitate the perpendicular insertion. As illustrated in FIG. 12, the receptacle 139 formed between the support members 110 includes an inwardly-tapering shape. Thus, an upper section of the receptacle 130 is larger and narrows to a smaller lower section. The taper is formed by the outer edges 95 of the connectors 10 being positioned at a non-perpendicular angle relative to the panel 100.

The connectors 10 give the solar panel 100 a complementary tapering shape. This shape is formed by the edges 119 of the support member 110 positioned at a complementary angle. As illustrated in FIG. 12, the connectors 10 form an inwardly-tapering outer edge 95 that is received in the receptacle 139 formed by the support members 110.

The complementary tapering shapes facilitate insertion in the vertical direction C. This further provides for the panel 100 to seat against the support members 110 and provide an effective connection with the seals 112 on the top 111 of the members 110. Further, seals 14 positioned at the end of the connector 10 are compressed against the support member 110.

As further illustrated in FIG. 12, the connectors 10 include the lip 33 that seats within the notch 116 of the support member 110. This prevents the panel 100 from moving laterally away from the support member 110 when engaged. When the panel 100 includes multiple connectors 10 that engage support members 110 on multiple sides, the interaction acts to secure the position and prevent movement of the panel 100 relative to the frame 140.

The connector 10 may include a pair of biasing members 50 as illustrated in the drawings, or may include a single biasing member or three or more biasing members 50 as necessary to apply the needed biasing force.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A connector to connect a panel to a support member, the connector comprising:
    a housing configured to be attached to the panel;
    a first member movably positioned within the housing, the first member comprising a first ramped contact surface and an outwardly-extending elongated arm that terminates at a distal end, the arm configured to engage the support member when the arm is in an extended position;
    a second member fixed relative to the housing; the second member comprising a second ramped contact surface that faces towards the first ramped contact surface;
    a holding space formed between the first and second ramped contact surfaces, the holding space including a width measured between the first and second ramped contact surfaces, the holding space being tapered with a width that is greater at a first section of the holding space and smaller at an opposing second section of the holding space due to arrangement of the first and second ramped contact surfaces;
    a biasing member that biases the first member towards the second member;
    a ferromagnetic wedge positioned in the holding space between the first and second members, the wedge comprising an elongated shape with opposing first and second ends;
    the ferromagnetic wedge sized to move within the housing (LAB) between a first position and a second position;
    the first position comprising the ferromagnetic wedge positioned at the first section of the holding space and in contact with each of the first and second members to space the first member away from the second member a first distance such that the distal end of the arm extends outward beyond the second member to engage the support member defining the extended position of the arm;
    the second position comprising the ferromagnetic wedge positioned at the second section of the holding space and in contact with each of the first and second members to space the second member away from the second member a second greater distance such that the distal end of the arm is positioned in closer proximity to the second member to disengage from the support member against the bias of the biasing member;

wherein the ferromagnetic wedge is sized to move within the housing from the first position to the second position when acted on by the magnet.

2. The connector of claim 1, further comprising a housing that extends around the first and second members and the biasing member, the housing comprising an opening through which the distal end of the elongated arm extends in the first position.

3. The connector of claim 2, wherein the second member is fixed relative to the housing and the first member is movable relative to the housing.

4. The connector of claim 1, wherein the arm forms an edge of the first section of the holding space and the wedge contacts against the arm in the first position.

5. The connector of claim 1, further comprising a latch connected to the first member, the latch comprising an elongated arm that extends outward from the first member away from the second member and includes a catch at a distal end, the latch further comprising a ferromagnetic member attached to the arm between the distal end and the first member.

6. The connector of claim 1, wherein each of the first and second ends of the wedge are ramped at an acute angle relative to a bottom of the wedge.

7. The connector of claim 6, wherein the acute angle of each of first and second ends is the same.

8. The connector of claim 1, wherein the wedge comprises first and second wedge sections and an intermediate member, each of the first and second sedge sections and the intermediate member comprise outer ends with ramped surfaces.

9. The connector of claim 8, further comprising a housing and wherein each of the first member, the first and second wedge sections, and the intermediate member are movable relative to the housing and that the second member is fixed relative to the housing.

10. A connector to connect a panel to a support member, the connector comprising:
a housing configured to be attached to the panel, the housing comprising an opening that extends through an exterior wall of the housing;
a first member movably positioned relative to the housing, the first member comprising a first ramped contact surface and an outwardly-extending arm that terminates at a distal end, the arm configured to engage the support member when the arm is in an extended position;
a second member fixedly positioned relative to the housing, the second member comprising a second ramped contact surface that faces towards the first ramped contact surface;
a biasing member that biases the first member towards the second member;
a ferromagnetic wedge positioned between the first and second members, the wedge comprising an elongated shape with opposing first and second ends with the first end being ramped and that faces towards the first ramped contact surface of the first member and the second end being ramped and that faces towards the second ramped contact surface of the second member;
the ferromagnetic wedge sized to move within the housing between a first position when not acted on by a magnet and a second position when acted on by the magnet against the bias of the biasing member;
the first position comprising the ferromagnetic wedge in contact along a first portion of each of the first and second ramped contact surfaces to space the first member away from the second member a first distance such that the distal end of the arm extends outward through the opening in the housing defining the extended position of the arm;
the second position comprising the ferromagnetic wedge in contact along a second portion of each of the first and second ramped contact surfaces to space the first member away from the second member a second greater distance such that the distal end of the arm is retracted within the opening in the housing.

11. The connector of claim 10, wherein the arm of the first member extends underneath and contacts against the second member.

12. The connector of claim 10, further comprising a latch connected to the first member, the latch comprising an elongated arm that extends outward from the first member away from the second member and includes a catch at a distal end, the latch further comprising a ferromagnetic member attached to the arm between the distal end and the first member.

13. The connector of claim 12, further comprising a receptacle formed in the housing and shaped to receive the catch at the distal end of the arm when the latch is secured to the housing.

14. The connector of claim 10, wherein the wedge comprises a bottom and each of the first and second ends are aligned at acute angles relative to the bottom.

15. The connector of claim 10, wherein the arm comprises first and second sections that are laterally spaced apart across a width of the arm.

* * * * *